(12) United States Patent
Trice

(10) Patent No.: US 8,262,311 B2
(45) Date of Patent: *Sep. 11, 2012

(54) SELF LOCKING MAST ASSEMBLY AND METHOD OF MAKING

(75) Inventor: Charles Trice, Ruffsdale, PA (US)

(73) Assignee: Charles Edward Trice, Ruffsdale, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/175,157

(22) Filed: Jul. 1, 2011

(65) Prior Publication Data

US 2011/0280359 A1 Nov. 17, 2011

Related U.S. Application Data

(63) Continuation of application No. 12/378,874, filed on Feb. 20, 2009, now Pat. No. 7,980,781.

(51) Int. Cl.
*F41B 5/20* (2006.01)

(52) U.S. Cl. .......... 403/349; 403/109.3; 403/109.6; 403/318

(58) Field of Classification Search ..... 403/109.1–109.4, 403/109.6, 109.8, 317, 318, 349, 378, 379.2
See application file for complete search history.

(56) References Cited

U.S. PATENT DOCUMENTS

| | | | |
|---|---|---|---|
| 2,049,289 A | 7/1936 | Burns et al. | |
| 2,049,290 A | 7/1936 | Burns et al. | |
| 2,323,988 A | 7/1943 | Martin | |
| 2,448,548 A | 9/1948 | Purdy | |
| 2,728,895 A | 12/1955 | Quackenbush et al. | |
| 4,019,833 A | 4/1977 | Gale | |
| 4,030,798 A | 6/1977 | Paoli | |
| 4,072,385 A | 2/1978 | Wallner | |
| 4,208,082 A | 6/1980 | Davies et al. | |
| 4,464,001 A | 8/1984 | Collins | |
| 4,943,182 A | 7/1990 | Hoblingre | |
| 5,435,760 A | 7/1995 | Miklos | |
| 5,513,622 A | 5/1996 | Musacchia, Sr. | |
| 5,839,524 A | 11/1998 | Sanford | |
| 5,957,716 A | 9/1999 | Buckley et al. | |
| 6,226,068 B1 | 5/2001 | Arcykiewicz et al. | |
| 6,386,897 B1 | 5/2002 | Muller | |
| 6,623,047 B2 | 9/2003 | Oleschnowicz et al. | |
| 7,712,189 B2 | 5/2010 | Francisco et al. | |
| 7,980,781 B2 * | 7/2011 | Trice | 403/349 |
| 8,002,491 B2 * | 8/2011 | Whitling et al. | 403/349 |
| 8,007,196 B2 * | 8/2011 | Whitling et al. | 403/109.1 |
| 2006/0288537 A1 | 12/2006 | Francisco et al. | |
| 2009/0242065 A1 | 10/2009 | Whitling et al. | |
| 2009/0245924 A1 | 10/2009 | Whitling et al. | |
| 2010/0246749 A1 | 9/2010 | Francisco et al. | |

* cited by examiner

*Primary Examiner* — Joshua Kennedy
(74) *Attorney, Agent, or Firm* — Nils H. Ljungman & Associates

(57) ABSTRACT

A mast arrangement having two elongate individual masts. The first elongate individual mast comprises a hollow connector comprising an inner diameter. The second elongate individual mast comprises a protruding connector end. The protruding connector end telescopically engages with the hollow connector end. The mast arrangement also comprises a pin and slot arrangement and collars to connect the masts together and minimize unwanted disengagement of the masts from each other.

9 Claims, 6 Drawing Sheets

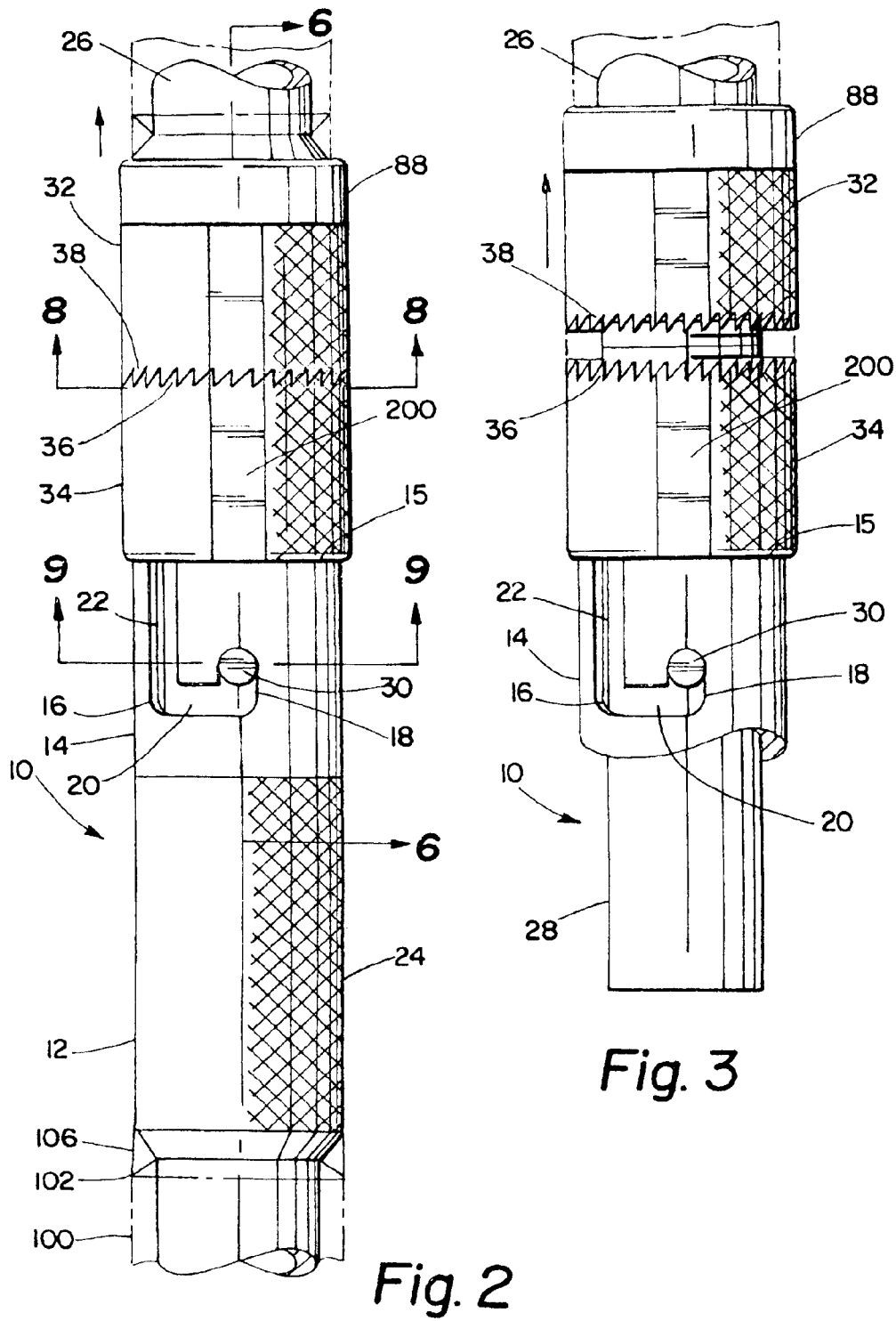

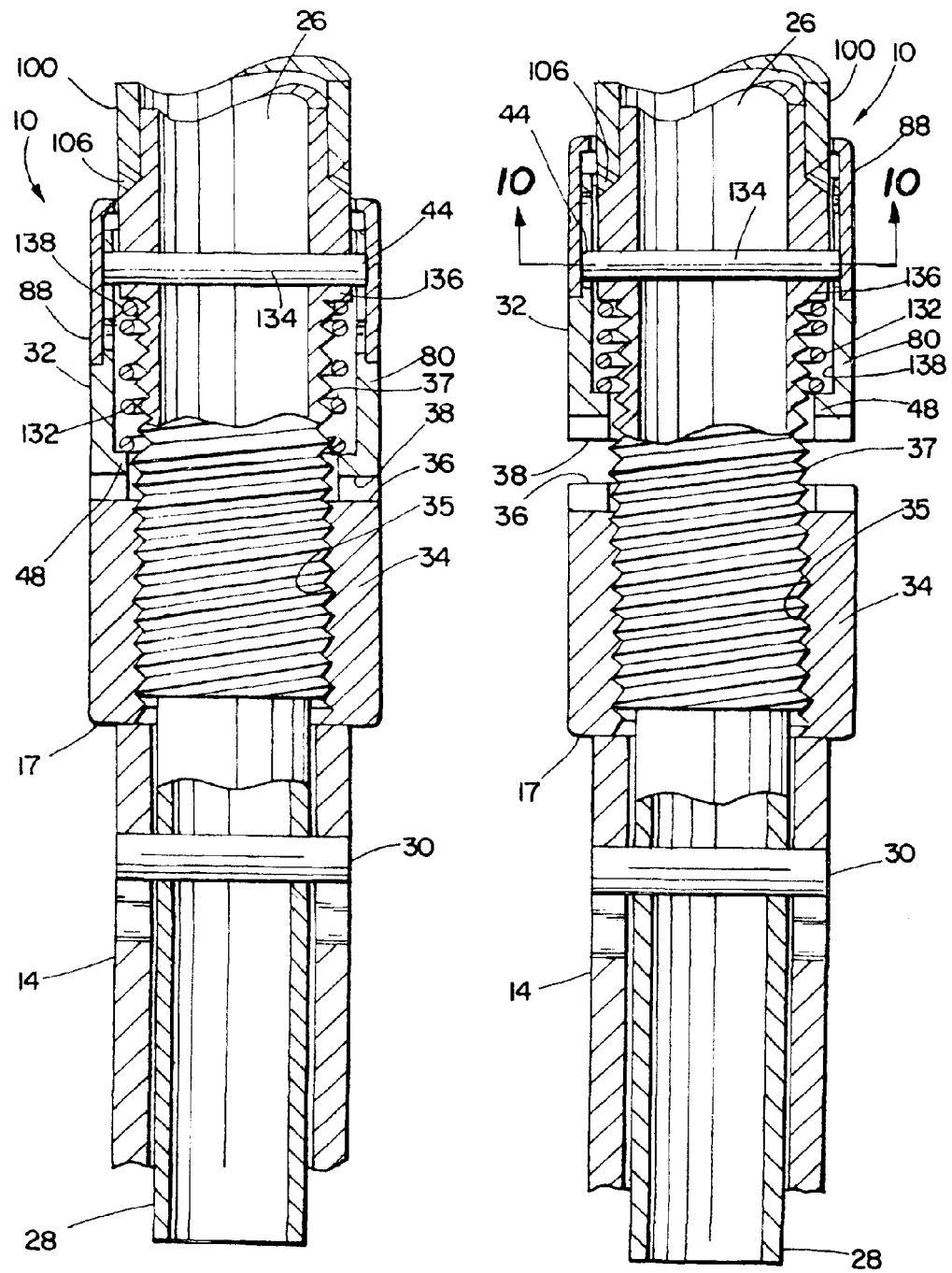

SELF LOCKING MAST ASSEMBLY AND METHOD OF MAKING

CROSS-REFERENCE TO RELATED APPLICATIONS

This application is a continuation of U.S. patent application Ser. No. 12/378,874, filed on Feb. 20, 2009, and has been issued as U.S. Pat. No. 7,980,781, issued on Jul. 19, 2011.

BACKGROUND

Technical Field

The present invention has to do with a much needed improvement of the tools used in the field of commercial nuclear power plants. Nuclear reactors have a reactor core made up of a number vertically positioned and elongated fuel rod bundles that provide the necessary nuclear materials or elements to heat water circulating the fuel bundles. When the fuel rod bundles have been depleted their nuclear materials are termed "spent" and a re-fueling of the reactor core must be performed. In re-fueling or maintenance the "spent" bundles are removed from the reactor core, remaining still useable "unspent" bundles are repositioned to the center of the reactor core, and new fuel rod bundles are added to the radially outer dimensions of the reactor core. Each fuel bundle has a relatively confined cavity space into which it must fit as it exists alongside the other vertically positioned bundles. The positioning of the new fuel bundles and the re-positioning of the unspent bundles requires tools that provide a manual dexterity to the workers. The bundles must be positively connected on the bottom of the reactor and their correct attachment and alignment is a critical part of the re-fueling operation. Because the water level of the reactor core is not drained and the water is not cooled for the re-fueling operation, special tools are required for the removal, insertion and cleaning of the bundles and cavities of the reactor core. Very special tools already have been developed for the removal, insertion and placement of the fuel bundles, but in addition to those tools there are other tools that are necessary for performing maintenance while the bundles are removed and before they are replaced. Maintenance workers extend tools into the watery cavities in order to perform a variety of required tasks and these tools usually comprise elongate, segmented, hollow poles, referred to as masts. On the distal end of the masts are attached tools that may be of the gripping, wrenching, rotating, or brushing type, and if they are pneumatically operated, usually have their air supply hoses extend along the exterior length of the masts. When using such segmented masts it is very important that the masts do not become disconnected from one another when being twisted and turned by the workers and further that they do not introduce any foreign materials to the reactor core. In current practices the existing segmented masts may be joined by threaded connections or pinned arrangements and duct tape is commonly used over the jointed section to aid in holding the masts together or intact during use. Duct tape is certainly not strong enough and creates the possibility of introducing its own foreign material into the reactor core. Duct tape also does not positively prevent any broken pins, springs, or other material failures from contaminating the core. Foreign material in the core area is extremely undesirable.

BRIEF SUMMARY OF THE INVENTION

It is an object of the present invention to provide a means to releasably attach separate individual elongate members to one another.

It is an object of the present invention to provide a releasable locking connector between individual pole segments.

It is an object of the present invention to provide co-operating elements of a self contained telescopic locking arrangement for individually separable pole segments.

It is an object of the present invention to provide a locking arrangement for telescopically engaged pole segments that holds the segments locked in relation to one another during use.

It is an object of the present invention to provide a tooling arrangement for the nuclear industry that provides a reliable and releasable locking connection for segmented poles used to extend tools into reactor cores.

It is a still further object of the present invention to provide a segmented pole locking arrangement where the individual locking elements are self-contained such that upon the failure or breakage of a locking part it will not contaminate the working environment.

It is a further object of the present invention to provide a reliable connector between mast poles so that tools may be extended into remote areas without the mast poles becoming disconnected.

It is a further object of the present invention to provide a reliable connection between mast poles so that tools may be extended into hostile environments without the mast poles becoming disconnected.

This invention has to do with a locking connector for two members having separable telescopic engagement with one another. The arrangement comprises first and second elongate individual members with a hollow end on the first member and a protruding reduced dimension end on the second member for telescopic engagement with the hollow end on the first member. A releasable co-operating pin and slot engagement arrangement, between the hollow end and the reduced end, provides for movement of the individual members from a first position to a second position. The first position allows the hollow end and the reduced end to be moved axially into and out of telescopic engagement with one another and the second position allows the members to be held in a non-movable in relation to one another. A pair of co-operating locking collars on one of the connector ends provides the means for releasably locking said pin and slot engagement in said second position.

The invention further comprises the method of making the individual connector ends according to the structure described and then attaching them to the ends of mast poles that are without the connections. The connector ends are furnished with weld attachment surfaces and weld prep areas so that they may be added to masts already existing in the field.

BRIEF DESCRIPTION OF THE DRAWINGS

FIG. 2 is a side view of the connector locked according to the present invention.

FIG. 3 is a side view of the upper collar retracted of the connector according to the present invention.

FIG. 6 is a cross section view of the connector in the locked position according to the present invention.

FIG. 7 is a cross section view of the upper collar retained of the connector according to the present invention.

DESCRIPTION OF EMBODIMENT OR EMBODIMENTS

Figure 1:
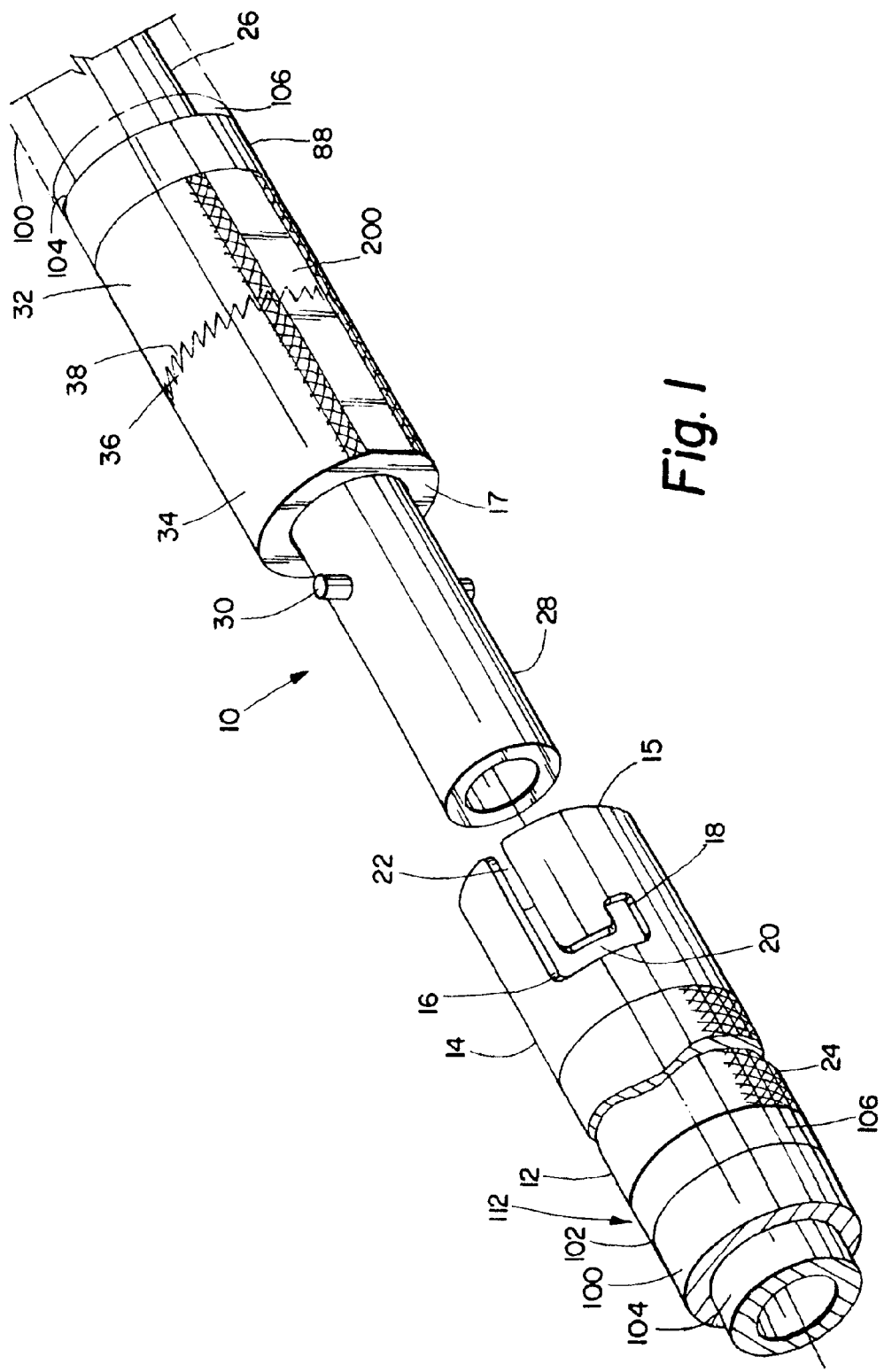
FIG. 1 is a perspective of the connector disconnected according to the present invention.

What is shown in FIG. 1 the self-locking mast assembly 10 according to the present invention. The mast assembly 10 has a first mast connector end 12 that has a hollow diameter telescopic engagement section 14 that extends inwardly from an abutment surface 15 located on a distal end of the mast connector end 12. The hollow diameter section 14 is shown having a J shaped slotted portion 16 on diametrically opposite sides of the telescopic section 14. The J shaped slot 16 is formed having a short leg as is shown at 18, a cross leg of the slot as is shown at 20 arid a pin communicating slot as is shown at 22. A knurled section 24 is provided on the hollow diameter section 14 and is an aid for a person hand gripping the mast connector end 12. A second mast connector end is shown at 26 and has a telescopic engagement diameter portion which is sized for co-operating engagement with hollow diameter section 14. In FIG. 1 telescopic diameter portion 28 has a reduced diameter from both the mast connector end 26 and telescopic section 14. The reduced telescopic engagement diameter section 28 has a pin 30, which extends through the diameter of the reduced diameter section 28 and protrudes radially above and outward on diametrically opposite sides of the telescopic engagement diameter portion 28. A first collar 32 is shown located on the second mast connector end 26 and (as will be seen later) the collar 32 is spring loaded so that is biased toward the pin 30 and into abutment with a second collar 34 on the second mast connector end 26. The collar 32 is also slidable linearly along a portion of the length of the mast connector end 26 and is partially rotatable about said mast connector end 26. The second collar 34 is located adjacent to the first collar 32 and the second collar 34, as will be seen later, is threadedly mounted on the diameter of second mast connector end 26 so that it is rotatable about the mast connector end 26, but not slidable along its length. The collar 34 is mounted on and threadedly engaged with mast connector end 26 so that it can be threadedly rotated so that it advances towards the pin 30 or away from the pin 30. Numbers 36 and 38 represent the cooperating elements of bevel engagement between the abutting ends of the two collars 32 and 34. The co-operating elements of bevel engagement 36 and 38, when in spring loaded abutting relation and engagement with one another, form a one way locking action between the two collars 32 and 34. The locking action occurs because the bevels 36 and 38 are angled in such a way that the collar 34 can be rotated so as to advance toward pin 30 and the engaged bevels 36 and 38 will allow relative rotation (ratcheting) between the engaged collars 32 and 34. The angle on the bevels will not allow collar 34 to be rotated in the opposite direction so as to advance away from pin 30. In the fully assembled and locked position collar 34 has its abutment surface 17 fully abutted against abutment surface 15 of connector end 14 and so cannot rotate any further in that direction. On the other end collar 34 has its bevels engaged with the bevels on collar 32 and the angled teeth of the bevels prevent any relative rotation of collar 34 in the opposite direction. In this manner is the connecting arrangement said to be self-locking when placed into full engagement. Wrench flats 200 are shown on collars 32 and 34 for ease of disassembly. While the connector ends 12 and 26 are shown the connector end 12 has an end 104 that is used to connect to a mast pole. For the purposes of this description the term mast is used to mean an elongate pole. The masts 100 are usually hollow but do not necessarily have to be. In this illustration the mast pole will have a weld prep end 102 that is joined to a weld prep area 112 on connector 12. The weld joint is shown at 106 and is the usual means of connecting the mast poles to both of the connector ends 12 and 26. The connector end 26 has a similar mast connector end as 12.

What is show in FIG. 2 is the self-locking mast assembly 10 showing the mast connector end 12 as it is fully engaged and connected in a self-locking manner to the mast connector end 26. The first mast connector end 12 has the hollow diameter section shown at 14 with the J slot 16. The pin 30 is shown engaged in the short leg 18 of the J slot 16. The second mast connector end 26 has its reduced diameter portion 28 engaged with and fully enclosed within the hollow diameter telescopic section 14 of the first mast connector end 12. The second mast connector end 26 is shown having the first and second collars 32 and 34 fully engaged through their co-operating locking bevel elements 38 and 36 respectively. The second collar 34 has been rotated on the threads provided on the second mast connector end 26 so that it is fully abutting the end 15 of the hollow diameter section 14. The first collar 32 is spring loaded or urged into engagement with the second collar 34 and the cooperating elements of locking bevels 36 and 38 are engaged so that relative rotational movement may only take place in one direction and may not take place so as to allow the collar 34 to advance away from pin 30. In this manner the two mast connector ends 12 and 26 are fastened together in a self-locking manner, wherein longitudinal movement between the ends is prevented and relative rotational movement between the collars 32 and 34 is prevented in one direction by the engagement of the bevels 36 and 38, and in the opposite direction by the abutment of the collar 34 with the abutment surface 15 on the connector end 12.

What is shown in FIG. 3 is again the self-locking mast assembly 10 according to the present invention, and this time showing a portion of the hollow diameter section 14 with the J shaped slot 16. The pin 30 is still engaged with the short leg 18 of the J shaped slot 16 and the second mast connector end 26 still has its protruding section 28 telescopically engaged within the hollow telescopic diameter section 14. In FIG. 3 the first collar 32 is shown pulled back against its spring-loaded direction and latched in place so that the cooperating elements of bevel engagement 36 and 38 are disengaged. The collar 32 has enough linear travel, from its forward most spring urged position to its rearward most position, so that it equals, at least, the linear distance of the J-shaped slot section 18. Pushing mast connector end 26 toward mast connector end 12 will then move pin 30 (located in telescopic section 28) into the J-shaped cross section slot 20. Relative rotation of the mast connectors 12 and 26 will then move pin 30 across cross slot 20 and into pin communication slot 22. The mast connector ends 12 and 26 may then be pulled apart. As can be seen in FIG. 3 when the first collar 32 is pulled back against its spring loaded direction, the second collar 34 may be threadedly advanced away from the hollow diameter section 14 and away from abutment with the end 15 of the hollow diameter telescopic section 14. It is necessary for the collar 32 to be held against its spring loaded direction in order to rotate the adjacent collar 34 to its desired position and the present invention provides a type of latching action that will hold the collar back to enable rotation of collar 34. The latching mechanism cannot be seen in this Figure but is provided between the internal slot 82 on the collar 32 and the protruding ends 44 of pin 134. The collar 32 is essentially made from two pieces (Reference FIGS. 11 and 12) 80 and cap 88. The way that the collar 32 is assembled on the mast connector end 26 requires that piece 80 (Shown in FIG. 11) is mounted on the connector end 26 at its desired location. Spring 132 is then loaded into the lower piece 80 of collar 32. Slot 82 then allows a properly sized hole to be drilled through the diameter of 26 and pin 134 fixedly mounted in the hole so that its opposing ends 44 protrude slightly beyond the inside diameter of the connector end 80. Cap 88 is then co-joined with the piece 80 by co-axially sliding a portion of its inner diameter over the slotted area 82 of piece 80. When the two pieces 88 and 80 are properly engaged they are then welded together. The collar 32 is then able to transverse back and forth along a small axial distance on the connector end and also able to rotate partially on connector end as defined by the dimensions of the slotted portion 86 of slot 82. With this arrangement the collar 32 may be moved back against its spring urged direction, and upon rotation, the protruding ends 44 of pin 134 will engage the slotted portion 86 of the piece 80 and be held back in that position. The collar 32 may be released by rotating the collar 32 back to its original position where pin 134 will communicate with the slotted portion 84 of the piece 80.

Figure 4:
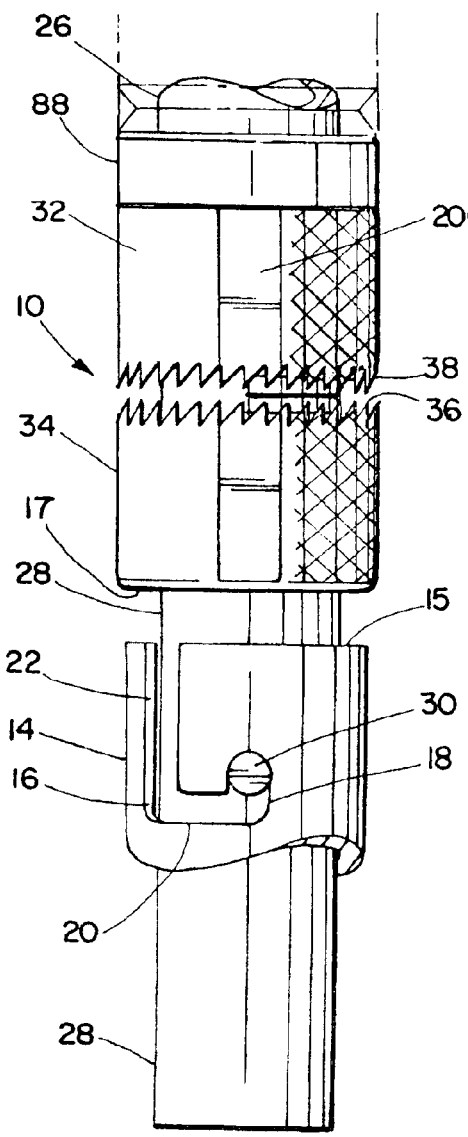
FIG. 4 is a side view of the lower collar in relation with the upper collar of the connector according to the present invention.

What is shown in FIG. 4 is the self-locking mast assembly 10 according to the present invention showing a portion of the hollow telescopic section 14 of the first mast connector end 12 as it is still engaged with the second mast connector end 26. The hollow diameter portion 14 is shown with the J shaped slot 16 still engaging the pin 30 of the reduced diameter section 28 of the second mast connector end 26. As was described in FIG. 3 the collar 32 had been pulled back against its spring urged direction and latched and now 34 has been rotated along its threaded portion so that it has advanced away from the abutment surface 15 of the enlarged diameter section 14. Enough of a space is provided between the abutment surface 17 on collar 34 and abutment surface 15 on the hollow diameter section 14 such that it is at least equal to or greater than the linear axial distance of the short leg slot 18 of the J shaped slotted portion 16. The first mast connector end 12 may be pushed forward such that the pin 30 will be able to traverse the cross leg 20 of the J shaped slot 16 and rotated into communication with the pin communication slot 22.

Figure 5:
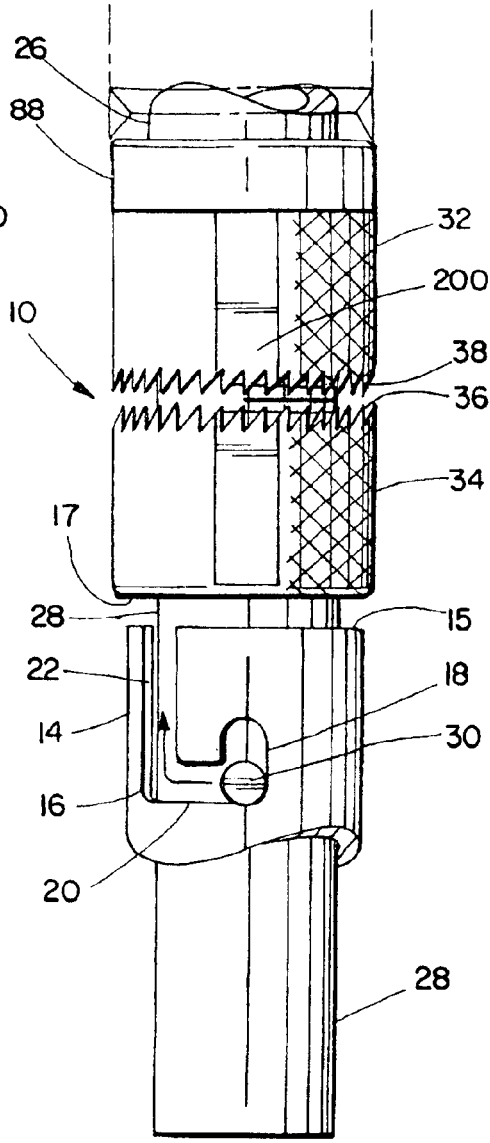
FIG. 5 is a side view with a second connector raised to begin removal from first connector according to the present invention.

What is shown in FIG. 5 is the self-locking mast assembly 10 according to the present invention showing a portion of the telescopic section 14 of the first mast connector end 12 and mast connector end 26. Relative rotation between connector ends 12 and 26 moves telescopic section 14 such that the J shaped slot 16 allows the pin 30 to transverse the cross leg 20 of the J shaped slot 16. In this manner, the pin 30 will traverse cross-leg 20 and communicate with the pin communication slot 22. The telescopic section 14 of the first mast connector end 12 will then be able to be disengaged entirely from the individual second mast connector end 26.

Figure 11:
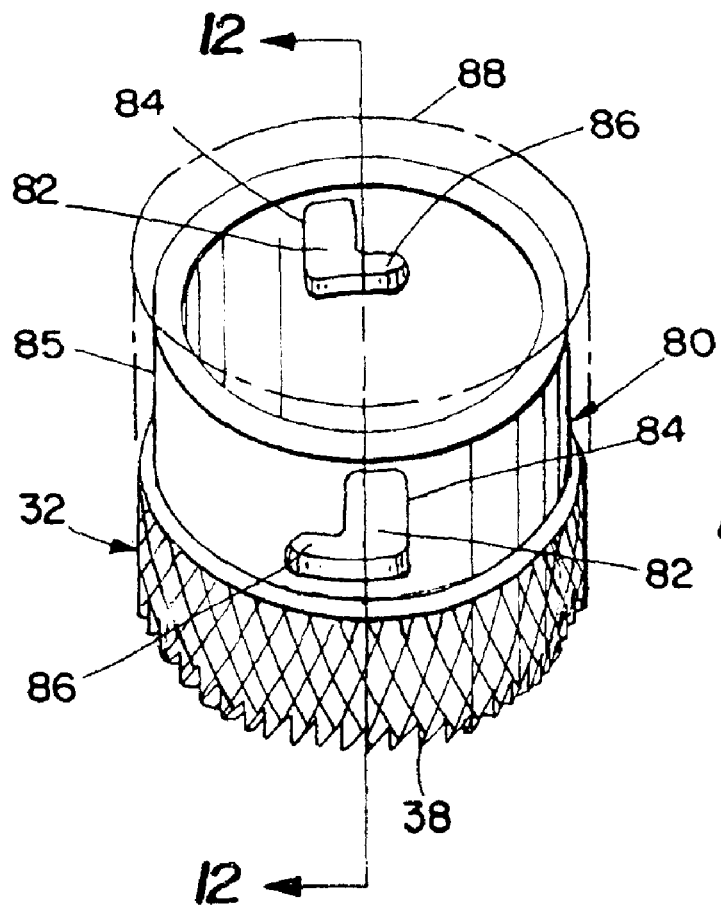
FIG. 11 is a perspective view of a portion of the collar 32 of the present invention.
Figure 12:
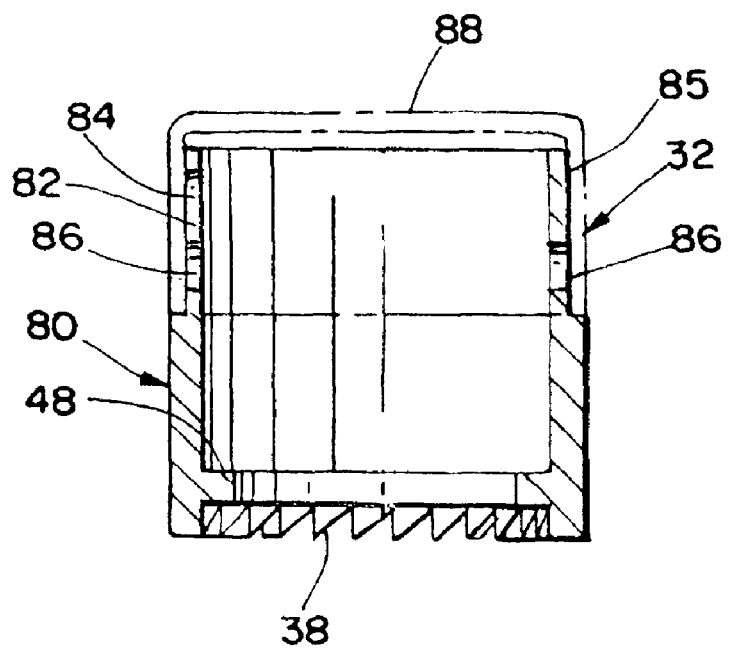
FIG. 12 is a longitudinal cross-sectional view 12-12 of the portion of the collar 32 in FIG. 11.

What is shown in FIG. 6 is a cross sectional view 6-6 of FIG. 2 according to the present invention. The self-locking mast assembly 10 is shown connecting the first and second mast connector ends 12 and 26, respectively, to one another. The reduced diameter portion 28 of the second mast connector end 26 is shown having the pin 30 therein. The collar 34 is shown having the cooperating elements of threaded connections 35 and 37. The collar 32 is shown having a spring 132 mounted on and adjacent to the outer diameter of the second mast connector 26, and pin 134 is mounted so that it extends through the diametrical sides of the second mast connector end 26 with each of its outer ends protruding slightly above the diameter of the second mast connector 26. The spring 132 is located in the internal relief 138 of the collar 32 and collar 32 has a spring facing abutment surface 48 that spring 132 abuts against to urge the collar 32 away from the pin 134. When grasping the collar 32 and pulling it towards the pin member 134 the spring 132 will be compressed. The construction of collar 32 as is shown in FIGS. 11 and 12 is shown in some detail in this Figure. As is shown in FIGS. 11 and 12 the collar 32 is shown formed as a two piece construction with cap 88 sliding down over piece 80 and welded into a fixed engagement as a finally assembled one piece construction collar 32. The reason for this is that when assembling the connector end 26 it was necessary to slide the piece 80 over the connector end 26 until the slot 82 was aligned with the hole in 26 that had been drilled for pin 134. Pin 134 is then inserted into its hole in a press-fit type of engagement. The pin 134 has been sized so that its ends protrude slightly above the diameter of the connector 26. With the pin 134 in place the cap 88 is then slid over the end of piece 80 and welded in place. In this manner the collar 32 and the pin 134 may have relative rotation between one another so that the pin 134 may provide the latching engagement when pin 134 is rotated into the slot portion 86. When rotated out of engagement with 86 the collar 32 may slide axially along the longitudinal axis of the connector 26.

What is shown in FIG. 7 is a cross sectional view of the self-locking mast assembly 10 according to the present invention. Collars 32 and 34 are mounted on the second mast connector end 26, and collar 32 has an internal relief 138 which provides an annular space around the diameter of the second mast connector end 26. A pin 134 is inserted through the diameter of mast connector end 26 and has extending ends 44 that protrude beyond the diameter of the mast connector end 26. A spring 132 surrounds the outer diameter of the mast connector end 26 just adjacent to the pin 134 and is confined by the lip portion 48 of the collar 32. In this way the spring 132 is compressed between the shoulder 136 and the lip 48 of the collar 32 such that the collar 32 is urged toward engagement of bevels 36 and 38. The collar 34 has cooperating threads 35 and 37 with the threads 37 formed on the diameter of the mast connector end 26 and threads 35 formed on the internal diameter of the collar 34. In this way the rotation of the collar 34 will advance the abutment surface 17 towards the engagement pin 30 or away from the engagement pin 30 as may be desired.

Figure 8:
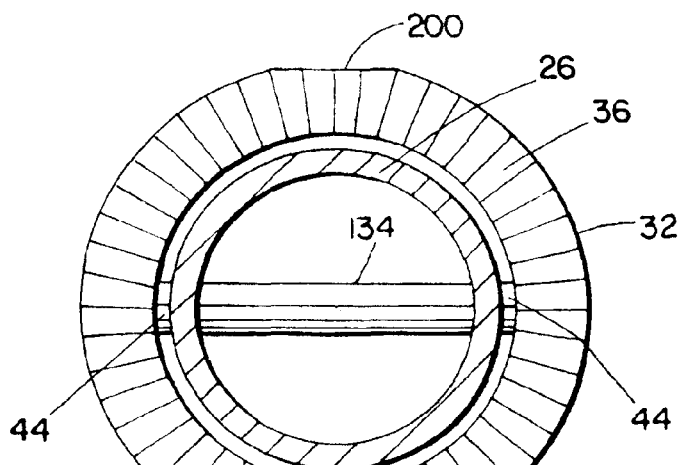
FIG. 8 is a transverse cross section 8-8 through FIG. 2 of the connector end according to the present invention.

What is shown in FIG. 8 is a transverse cross sectional view 8-8 of FIG. 2 of the mast assembly 10 according to the present invention. Shown in FIG. 8 is the bevel surface 38 on collar 32. Pin 134 is shown extending through the mast 26.

Figure 9:
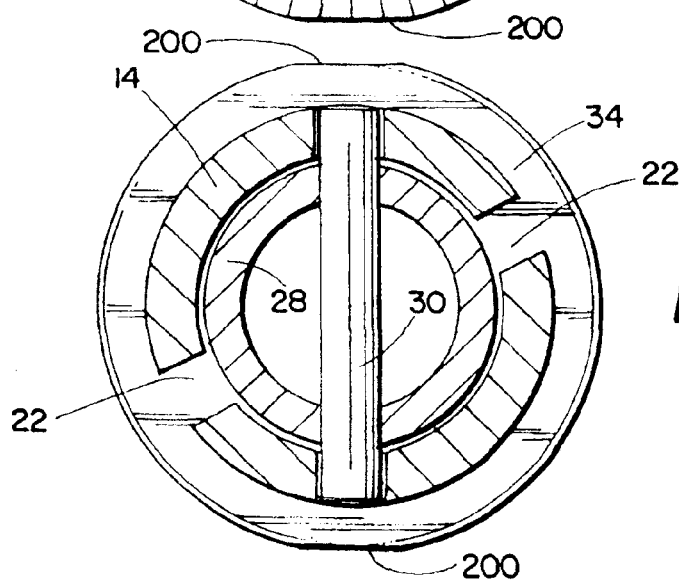
FIG. 9 is a transverse cross section 9-9 through FIG. 2 of the connector end according to the present invention.

What is shown FIG. 9 is a transverse cross sectional view 9-9 through FIG. 2 of the mast assembly 10 according to the present invention. Shown in FIG. 9 is pin 30 extending through hollow diameter portion 14 of first mast connector end 12. Slot 22 is shown formed in opposite sides of the hollow connector end 14. Collar 34 is shown with wrench flats 200.

Figure 10:
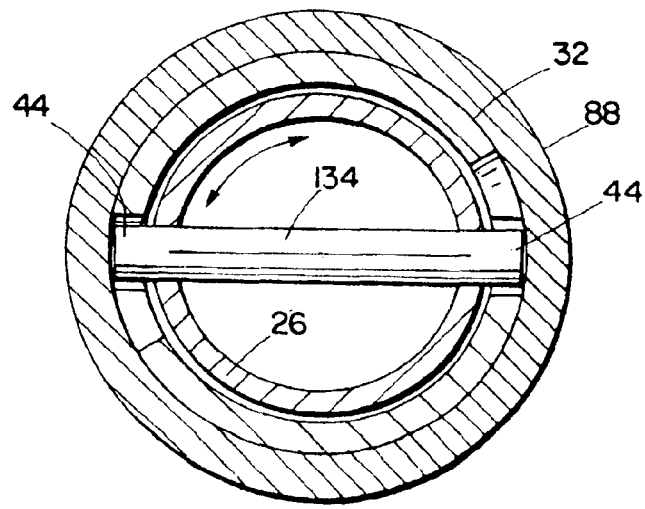
FIG. 10 is a transverse cross section 10-10 through FIG. 7 of the connector end according to the present invention.

What is shown in FIG. 10 is a transverse cross sectional view 10-10 through FIG. 7 of the mast assembly 10 according to the present invention. Shown in FIG. 10 is the pin 134 extending through the diameter of mast 26.

What is shown in FIG. 11 is a perspective view of the collar 32. The collar 32 is actually made from two pieces with the first part 80 as shown in FIG. 11. The part 80 is shown with an L-shaped slot 82 formed through the sidewall having an axial extending portion shown at 84 and a circumferential extending slot shown at 86. The L-shaped slot is formed on opposite diametrical sides of the thimble like part 80. The part 80 will be mounted on the second mast connector end 26 so that the opposing slots 82 will surround the protruding portions 44 of pin 134 that extend beyond the diameter of 26 as is shown in FIGS. 6, 8 and 10. A tubular cap 88 will then be fitted down over the top part 85 of the piece 80 and the cap will be welded to portion 80 thereby forming the collar 32. Cap 88 is shown in FIGS. 6 and 7. The reason for this arrangement is that in assembling the collar 32, the spring 132 and the pin 134 it will be necessary to insert first the spring 132, then the pin 134, while the piece 80 is mounted on the mast connector end 26 with the slots 82 aligned with the hole drilled through mast connector end 26 that is to receive the pin 134. When the pin 134 is then inserted the cap 88 may then be slid down so that its tubular portion covers the slots 82 and then fixed to part 80 by welding or other equivalent means. Collar 32 is then limited in its movement about the mast connector end 26 by the two legs 84 and 86 of the slots 82.

What is shown in FIG. 12 is a view 12-12 through FIG. 11. The part 80 is shown with the bevel teeth 38 and the slot portions 84 and 86.

The connector ends are usually made from an aluminum material and when that is the case a further coating and or anodizing process may be employed to protect the material from any harsh environment that it may encounter.

Other objects and further scope of applicability of the present invention will become apparent from the detailed description; it should be understood however that the detailed description, while indicating certain embodiments of the invention, is given by way of illustration only, since various changes and modifications within the spirit and scope of the invention will become apparent to those skilled in the art.

What is claimed is:

1. A mast arrangement comprising:
   first and second elongate individual masts;
   said first elongate individual mast comprising a hollow connector end;
   said hollow connector end having an inner diameter;
   said second elongate individual mast comprising an elongated body portion;
   said elongated body portion comprising a protruding connector end;
   said protruding connector end having an outer diameter;
   said outer diameter of said protruding connector end being smaller than said inner diameter of said hollow connector end to permit telescopic engagement with said hollow connector end;
   said hollow connector end comprising a slot arrangement;
   said protruding connector end comprising a pin with ends;
   said pin being configured and disposed to extend through said protruding connector end with said ends protruding beyond the smaller, outer diameter of said protruding connector end;
   said pin being configured to be inserted into said slot arrangement and moved into a final position in said slot arrangement, in which final position said pin engages said slot arrangement to essentially prevent relative rotational movement of said first and second elongate individual masts, and to minimize axial movement of said first and second elongate individual masts away from one another to prevent disengagement of said first and second elongate individual masts;
   said elongated body portion comprising a threaded portion disposed adjacent said protruding connector end;
   said second elongate individual mast comprising first and second adjacent collars coaxially mounted on said elongated body portion adjacent said protruding connector end;
   said first adjacent collar being threadedly mounted on said threaded portion of said elongated body portion;
   said first adjacent collar being configured to be rotatably, axially moved between a first position in which said first adjacent collar is at a first distance from said pin, and a second position in which said first adjacent collar is at a second, shorter distance from said pin;
   said first adjacent collar being configured to be moved into said first position to permit insertion of said pin into said slot arrangement, and to permit movement of said pin into said final position in said slot arrangement, and to permit removal of said pin from said final position and out of said slot arrangement;
   said first adjacent collar being configured to be moved into said second position and into contact with said hollow connector end, upon said pin being in said final position, to essentially prevent movement of said pin from said final position and to minimize relative axial movement of said first and second elongate individual masts to prevent disengagement of said first and second elongate individual masts;
   said second adjacent collar being axially moveable along said elongated body portion, and being spring mounted on said elongated body portion so as to be urged toward said first adjacent collar and said pin;
   said first adjacent collar and said second adjacent collar comprising an arrangement to permit rotational movement therebetween in a first direction and inhibit rotational movement therebetween in a second direction, which second direction is opposite said first direction;
   said second adjacent collar being configured to be temporarily axially moved away from and out of engagement with said first adjacent collar to permit rotational, axial movement of said first adjacent collar away from said pin; and
   said second adjacent collar being configured to lock said first adjacent collar in said second position to essentially prevent unwanted disconnection of said first and second elongate individual masts from each other.

2. The mast arrangement according to claim 1, wherein said slot arrangement comprises a pair of slots formed in diametrical opposite sides of said hollow connector end wherein each end of said pin is configured to engage a corresponding one of said slots.

3. The mast arrangement according to claim 2, wherein said pair of slots comprises a pair of J-shaped slots.

4. Connectors for joining together elongate mast pole assemblies comprising:
   a first connector comprising a hollow connector end;
   said hollow connector end having an inner diameter;
   a second connector comprising an elongated body portion;
   said elongated body portion comprising a protruding connector end;
   said protruding connector end having an outer diameter;
   said outer diameter of said protruding connector end being smaller than said inner diameter of said hollow connector end to permit telescopic engagement with said hollow connector end;
   said hollow connector end comprising a slot arrangement;
   said slot arrangement comprises a pair of slots formed in diametrical opposite sides of said hollow connector end wherein each end of said pin is configured to engage a corresponding one of said slots;

said protruding connector end comprising a pin with ends;
said pin being configured and disposed to extend through said protruding connector end with said ends protruding beyond the diameter of said protruding connector end;
said pin being configured to be inserted into said slot arrangement and moved into a final position in said slot arrangement, in which final position said pin engages said slot arrangement to essentially prevent relative rotational movement of said first and second connectors, and to minimize axial movement of said first and second connectors away from one another to prevent disengagement of said first and second connectors;
said elongated body portion comprising a threaded portion disposed adjacent said protruding connector end;
said second connector comprising first and second adjacent collars coaxially mounted on said elongated body portion adjacent said protruding connector end;
said first adjacent collar being threadedly mounted on said threaded portion of said elongated body portion;
said first adjacent collar being configured to be rotatably, axially moved between a first position in which said first adjacent collar is at a first distance from said pin, and a second position in which said first adjacent collar is at a second, shorter distance from said pin;
said first adjacent collar being configured to be moved into said first position to permit insertion of said pin into said slot arrangement, and to permit movement of said pin into said final position in said slot arrangement, and to permit removal of said pin from said final position and out of said slot arrangement;
said first adjacent collar being configured to be moved into said second position and into contact with said hollow connector end, upon said pin being in said final position, to essentially prevent movement of said pin from said final position and to minimize relative axial movement of said first and second connectors to prevent disengagement of said first and second connectors;
said second adjacent collar being axially moveable along said elongated body portion, and being spring mounted on said elongated body portion so as to be urged toward said first adjacent collar and said pin;
said first adjacent collar and said second adjacent collar comprising an arrangement to permit rotational movement therebetween in a first direction and inhibit rotational movement therebetween in a second direction, which second direction is essentially opposite said first direction;
said second adjacent collar being configured to be temporarily axially moved away from and out of engagement with said first adjacent collar to permit rotational, axial movement of said first adjacent collar away from said pin; and
said second adjacent collar being configured to lock said first adjacent collar in said second position to essentially prevent unwanted disconnection of said first and second connectors from each other.

5. The connectors according to claim 4, wherein said pair of slots comprises a pair of J-shaped slots.

6. A nuclear reactor tool-carrying mast structure being configured to be extended into a nuclear reactor core comprising:
first and second elongate individual masts;
said first elongate individual mast comprising a hollow connector end;
said hollow connector end having an inner diameter;
said second elongate individual mast comprising an elongated body portion;
said elongated body portion comprising a protruding connector end;
said protruding connector end having an outer diameter;
said outer diameter of said protruding connector end being smaller than said inner diameter of said hollow connector end to permit telescopic engagement with said hollow connector end;
said hollow connector end comprising a slot arrangement;
said protruding connector end comprising a pin with ends;
said pin being configured and disposed to extend through said protruding connector end with said ends protruding beyond the smaller, outer diameter of said protruding connector end;
said pin being configured to be inserted into said slot arrangement and moved into a final position in said slot arrangement, in which final position said pin engages said slot arrangement to essentially prevent relative rotational movement of said first and second elongate individual masts, and to minimize axial movement of said first and second elongate individual masts away from one another to prevent disengagement of said first and second elongate individual masts;
said elongated body portion comprising a threaded portion disposed adjacent said protruding connector end;
said second elongate individual mast comprising first and second adjacent collars coaxially mounted on said elongated body portion adjacent said protruding connector end;
said first adjacent collar being threadedly mounted on said threaded portion of said elongated body portion;
said first adjacent collar being configured to be rotatably, axially moved between a first position in which said first adjacent collar is at a first distance from said pin, and a second position in which said first adjacent collar is at a second, shorter distance from said pin;
said first adjacent collar being configured to be moved into said first position to permit insertion of said pin into said slot arrangement, and to permit movement of said pin into said final position in said slot arrangement, and to permit removal of said pin from said final position and out of said slot arrangement;
said first adjacent collar being configured to be moved into said second position and into contact with said hollow connector end, upon said pin being in said final position, to essentially prevent movement of said pin from said final position and to minimize relative axial movement of said first and second elongate individual masts to prevent disengagement of said first and second elongate individual masts;
said second adjacent collar being axially moveable along said elongated body portion, and being spring mounted on said elongated body portion so as to be urged toward said first adjacent collar and said pin;
said first adjacent collar and said second adjacent collar comprising an arrangement to permit rotational movement therebetween in a first direction and inhibit rotational movement therebetween in a second direction, which second direction is essentially opposite said first direction;
said second adjacent collar being configured to be temporarily axially moved away from and out of engagement with said first adjacent collar to permit rotational, axial movement of said first adjacent collar away from said pin; and said second adjacent collar being configured to lock said first adjacent collar in said second position to essentially prevent unwanted disconnection of said first and second elongate individual masts from each other.

7. The nuclear reactor tool-carrying mast structure according to claim 6, wherein said slot arrangement comprises a pair of slots formed in diametrical opposite sides of said hollow connector end wherein each end of said pin is configured to engage a corresponding one of said slots.

8. The nuclear reactor tool-carrying mast structure according to claim 7, wherein said pair of slots comprises a pair of J-shaped slots.

9. The nuclear reactor tool-carrying mast structure according to claim 8, in combination with tools of the gripping, wrenching, rotating, or brushing type.

\* \* \* \* \*